(12) United States Patent
Mader et al.

(10) Patent No.: US 9,912,976 B1
(45) Date of Patent: Mar. 6, 2018

(54) METHOD AND SYSTEM FOR DIRECTING SERVICE OFFERINGS CORRESPONDING TO A CUSTOMER RISK PROFILE

(71) Applicant: The DIRECTV Group, Inc., El Segundo, CA (US)

(72) Inventors: Kent P. Mader, Hermosa Beach, CA (US); Aditya P. Mishra, Torrance, CA (US); Sunaina Chaudhary, Santa Fe Springs, CA (US); Safia Benaouda, Venice, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

(21) Appl. No.: 14/805,564

(22) Filed: Jul. 22, 2015

(51) Int. Cl.
*H04N 7/16* (2011.01)
*H04N 21/2668* (2011.01)
*G06Q 20/14* (2012.01)
*G06Q 40/02* (2012.01)
*G06Q 30/00* (2012.01)
(Continued)

(52) U.S. Cl.
CPC ....... *H04N 21/2668* (2013.01); *G06Q 20/145* (2013.01); *G06Q 30/016* (2013.01); *G06Q 40/025* (2013.01); *H04N 21/25435* (2013.01); *H04N 21/25891* (2013.01); *H04N 21/44222* (2013.01); *H04N 21/6143* (2013.01)

(58) Field of Classification Search
CPC .. H04N 21/2543; H04N 7/162; H04N 21/258; H04N 21/25883; H04N 21/2668; H04N 21/4755; H04N 21/26225; H04N 2005/44556; H04N 2005/44565; H04N 21/4532; H04N 5/44543; H04N 21/44222; H04N 7/163; H04N 21/482; H04N 7/17309; H04N 7/17318; H04N 7/165; H04N 7/10; H04N 21/4622; H04N 5/4401; H04N 21/478; H04H 20/76

See application file for complete search history.

(56) References Cited

U.S. PATENT DOCUMENTS 7,827,574 B1 * 11/2010 Hendricks .............. H04H 20/42
725/14
8,826,347 B1 * 9/2014 Earle .................. H04N 21/4825
725/109

(Continued)

*Primary Examiner* — Ngoc K Vu
(74) *Attorney, Agent, or Firm* — Harness, Dickey & Pierce, PLC

(57) ABSTRACT

A system and method includes a first user device and a head end. The head end has a billing system an audience measurement module. A billing system associates first content package data with first account data comprising a first account identifier. The first user device communicates a viewing history to the audience measurement module. The audience measurement module stores the viewing history over time. The head end communicates account data and the viewing history to a customer service system. The customer service system forms a selection signal by selecting second package content data. A comparison list is displayed comparing first package data and second package data. The customer service system communicates a confirmation signal to the billing system. The billing system associates the first content package data with the first account data. An authorization signal is communicated to the first user device to enable receiving the second content package.

24 Claims, 9 Drawing Sheets

(51) Int. Cl.
*H04N 21/258* (2011.01)
*H04N 21/442* (2011.01)
*H04N 21/2543* (2011.01)
*H04N 21/61* (2011.01)

(56) References Cited

U.S. PATENT DOCUMENTS

| | | |
|---|---|---|
| 9,071,370 B2 | 6/2015 | Toner et al. |
| 2008/0046914 A1* | 2/2008 | Gummadi .......... H04N 5/44543 725/25 |
| 2011/0321072 A1* | 12/2011 | Patterson ......... H04N 21/44222 725/5 |
| 2013/0263174 A1* | 10/2013 | Chaudhari ....... H04N 21/25435 725/28 |

\* cited by examiner

Recommendations for 3627775

| Account Current Package Info for: 3A21232 | | | | | |
|---|---|---|---|---|---|
| Account ID | Package ID | Package Name | Total Channels | Ranking | Status |
| 3A21232 | P101581 | XTRA | 313 | 60 | ACTV |

Filters

| Compared Package Status | Compared Cat... ▼ | Base Package |
|---|---|---|
| ACTV / GF | Sub Category ▼ | ☐ |

Select Down Sized Package ID

Down Sized Package =

🔍 Please Enter Package ID or Package Description

Top 10 Recommended Packages for: -3A21232

| Percentage of Watched Channels in Package | Package | Channels in Package | Common Channels to Current Package | Less Channels |
|---|---|---|---|---|
| 78% | Choice | 261 | 261 | 52 |
| 69% | Entertainment Classic – no |c| | 246 | 246 | 67 |
| 56% | Optimo Mas | 273 | 223 | 90 |
| 56% | Choice | 247 | 247 | 66 |
| 53% | Entertainment | 232 | 232 | 81 |
| 53% | Total Choice Limited | 224 | 224 | 89 |

METHOD AND SYSTEM FOR DIRECTING
SERVICE OFFERINGS CORRESPONDING
TO A CUSTOMER RISK PROFILE

TECHNICAL FIELD

The present disclosure relates generally to a broadcasting system and, more specifically, to a method and system for directing service offerings to customers that correspond to channels that customers view.

BACKGROUND

The statements in this section merely provide background information related to the present disclosure and may not constitute prior art.

Content providers offer a substantial amount of channels. The channels are typically subscribed to in packages. Typically, a lower number of content channels results in a lower overall monthly cost for the packages. At present, DIRECTV® offers a Select package with 145 channels, an Entertainment package with 150 channels, a Choice package with 175 channels, an "Xtra" package with 220 channels, an Ultimate package with 240 channels and a Premier package with 315 channels. Packages with more channels have a greater monthly cost. In addition to the packages, various premium channels may be added to certain packages. For example, premium movie networks and sports networks may also be added to the packages. Movie packages typically include a plurality of movie channels. Sports packages typically include multiple sporting event channels.

Customers typically only view a limited amount of the channels available in a package. Customers do not want to lose those channels they view the most. However, when a customer becomes unable to pay monthly fees, they may be reluctant to change to another package for fear of losing channels.

SUMMARY

The present disclosure provides a method and system for customer service representatives to quickly and easily determine alternative content channel packages for customers that have a lower cost and provide all or most of the content channels for the customer.

In one aspect of the disclosure, a method includes associating first content package data with first account data comprising a first account identifier at a billing system, communicating viewing history from a first user device associated with the account identifier to an audience measurement module located remotely from the first user device, storing the viewing history over time at the audience measurement module, communicating account data and the viewing history to a customer service system through a network, selecting second package content data at the customer service system to form a selection signal, displaying a comparison list comparing first package data and second package data, generating a confirmation signal at the customer service system, communicating the confirmation signal through a network to the billing system, associating the first content package data with the first account data at the billing system and communicating an authorization signal from an authorization module to the first user device to enable the second content package.

In a further aspect of the disclosure, a system includes a first user device and a head end comprising an audience measurement module in communication with the first user device located remotely from the first user device. A billing system in the head end is in communication with the audience measurement module associating first content package data with first account data comprising a first account identifier. The first user device communicates a viewing history from the first user device associated with the account identifier to the audience measurement module. The audience measurement module stores the viewing history over time. A customer service system is in communication with the head end through a network. The head end communicates account data and the viewing history to a customer service system through a network. The customer service system forms a selection signal by selecting second package content data in response to a user interface. A display in communication with the customer service system displays a comparison list comparing first package data and second package data. The customer service system generates a confirmation signal and communicates the confirmation signal through a network to the billing system. The billing system associates the first content package data with the first account data. An authorization signal is communicated from an authorization module to the first user device to enable receiving the second content package.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 5 is a screen display of the user interface for a recommendations page.

FIG. 6 is a screen display of the user interface for recommended package details.

DETAILED DESCRIPTION

Figure 1:
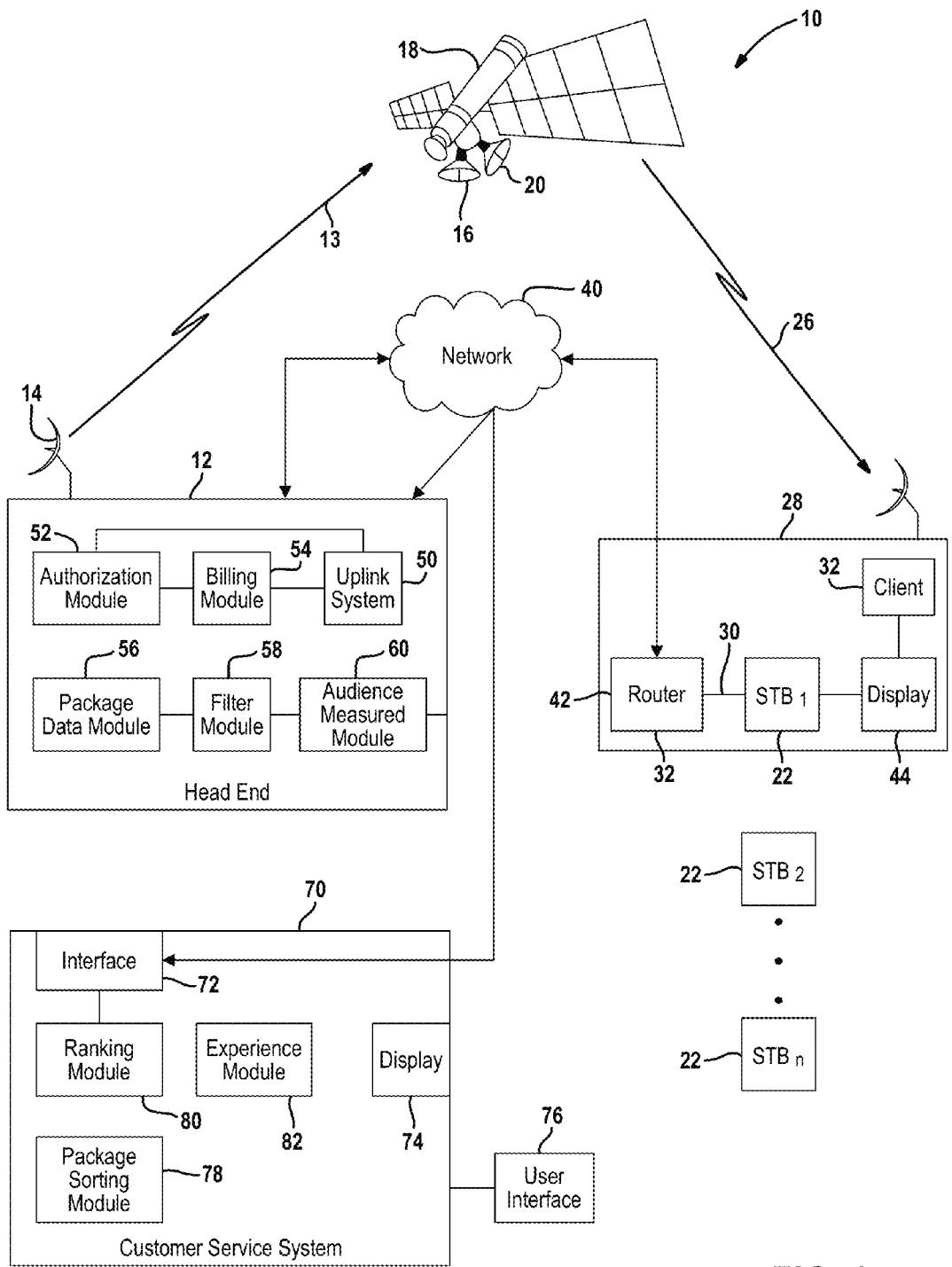
FIG. 1 is a high level block diagrammatic view of a satellite communication system and a customer service system.
Figure 2A:
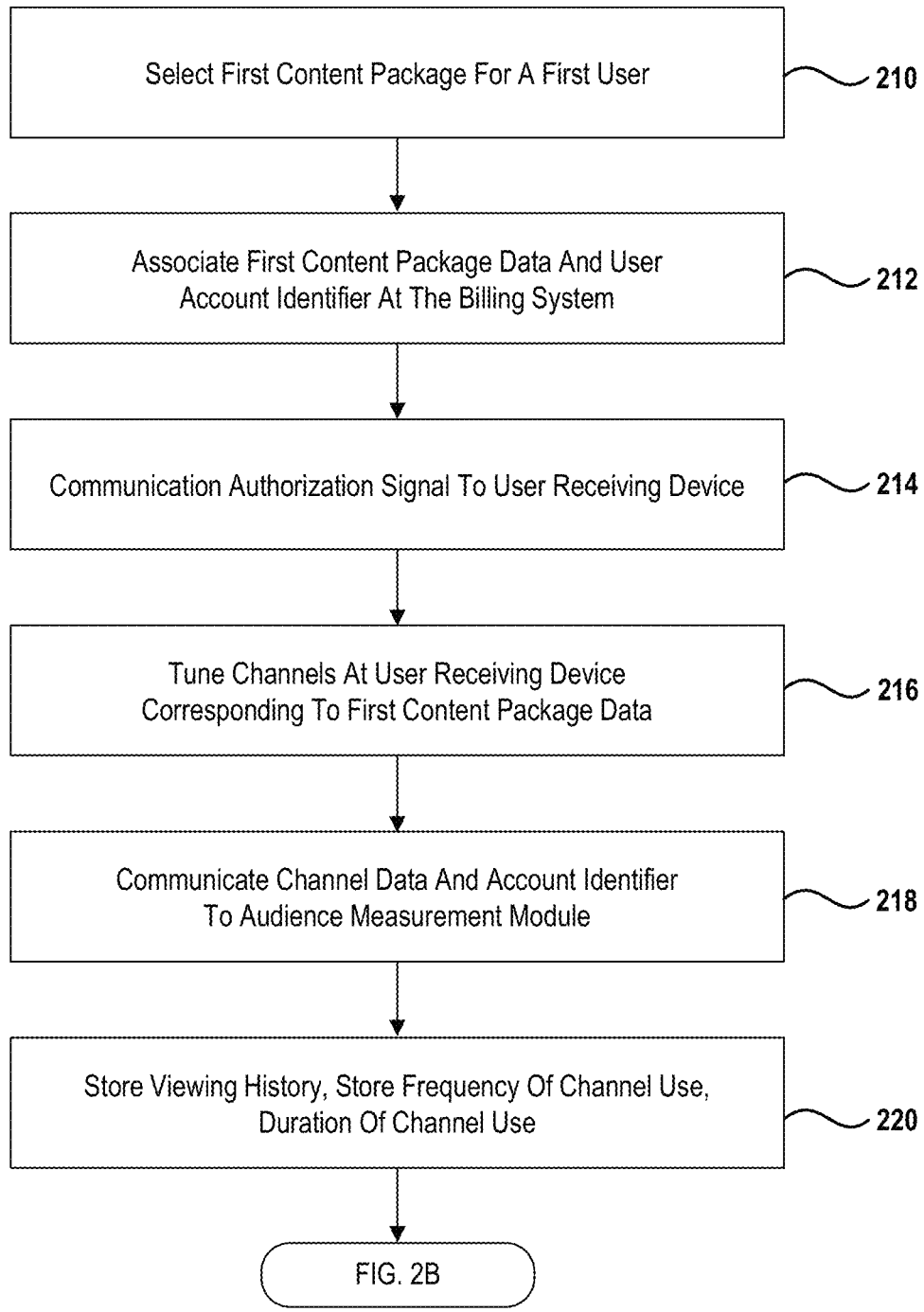
FIGS. 2A-2D are a flowchart of a method for generating recommended content packages for customers.
Figure 2B:
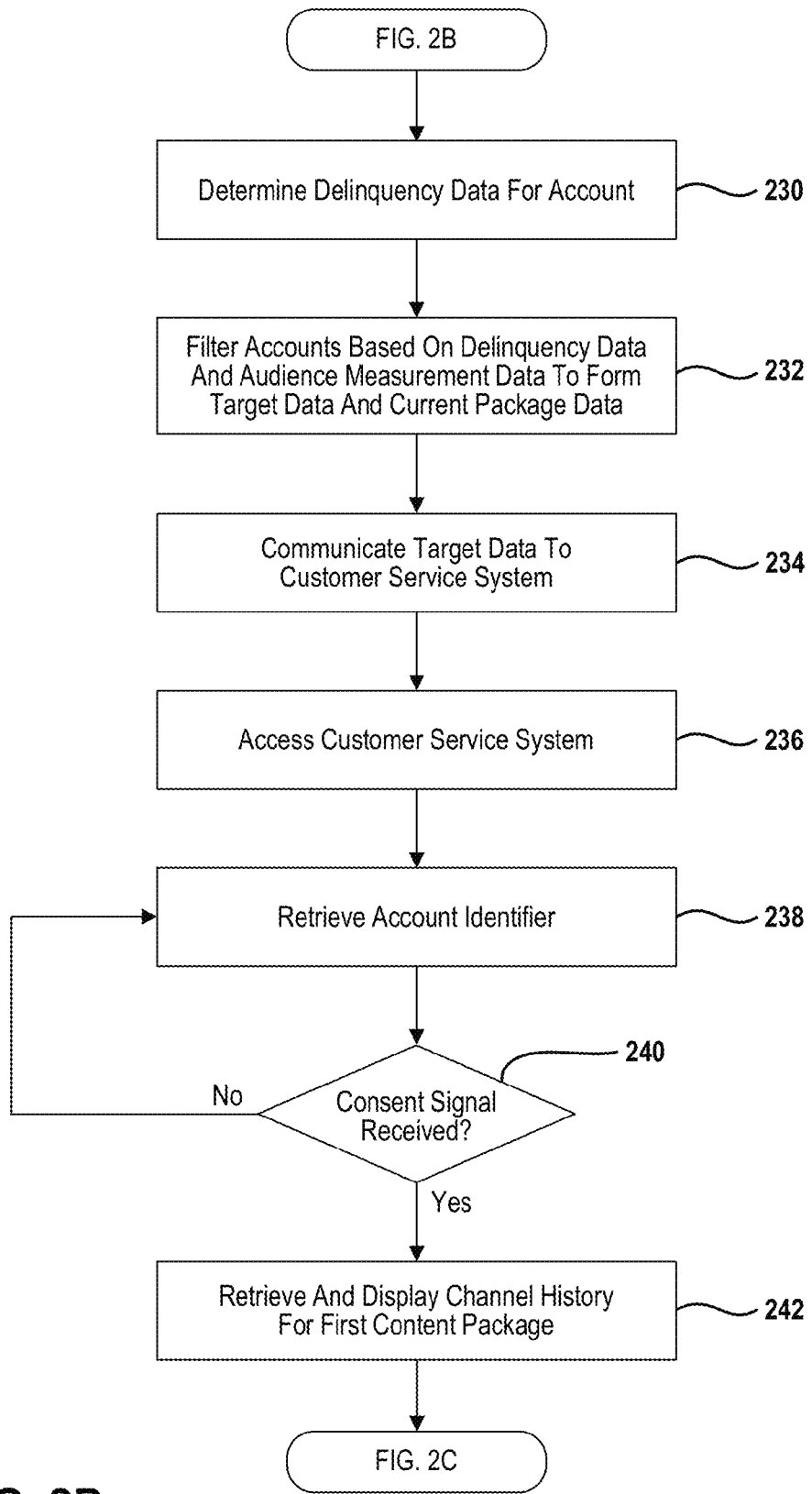
Figure 2C:
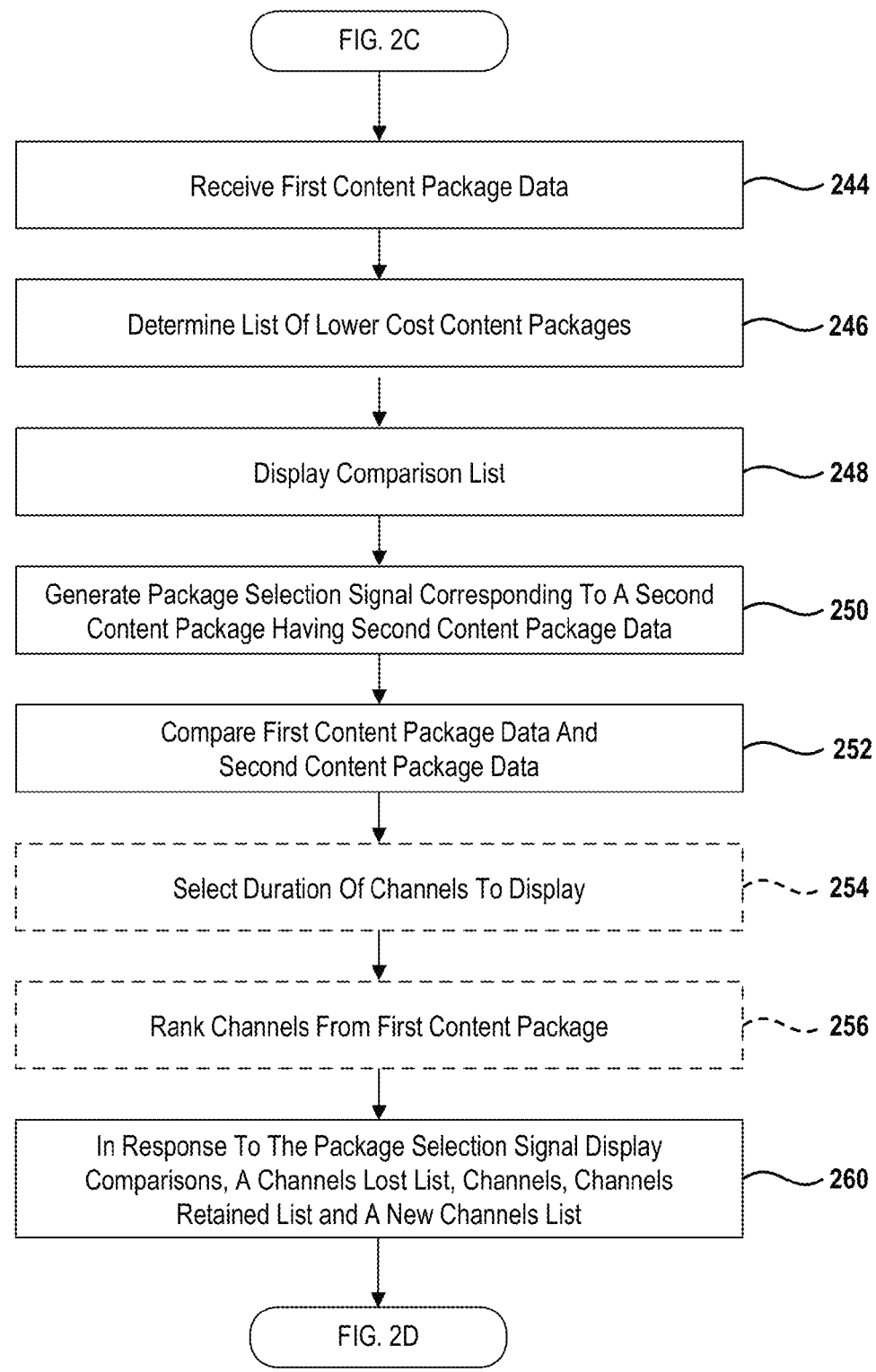
Figure 2D:
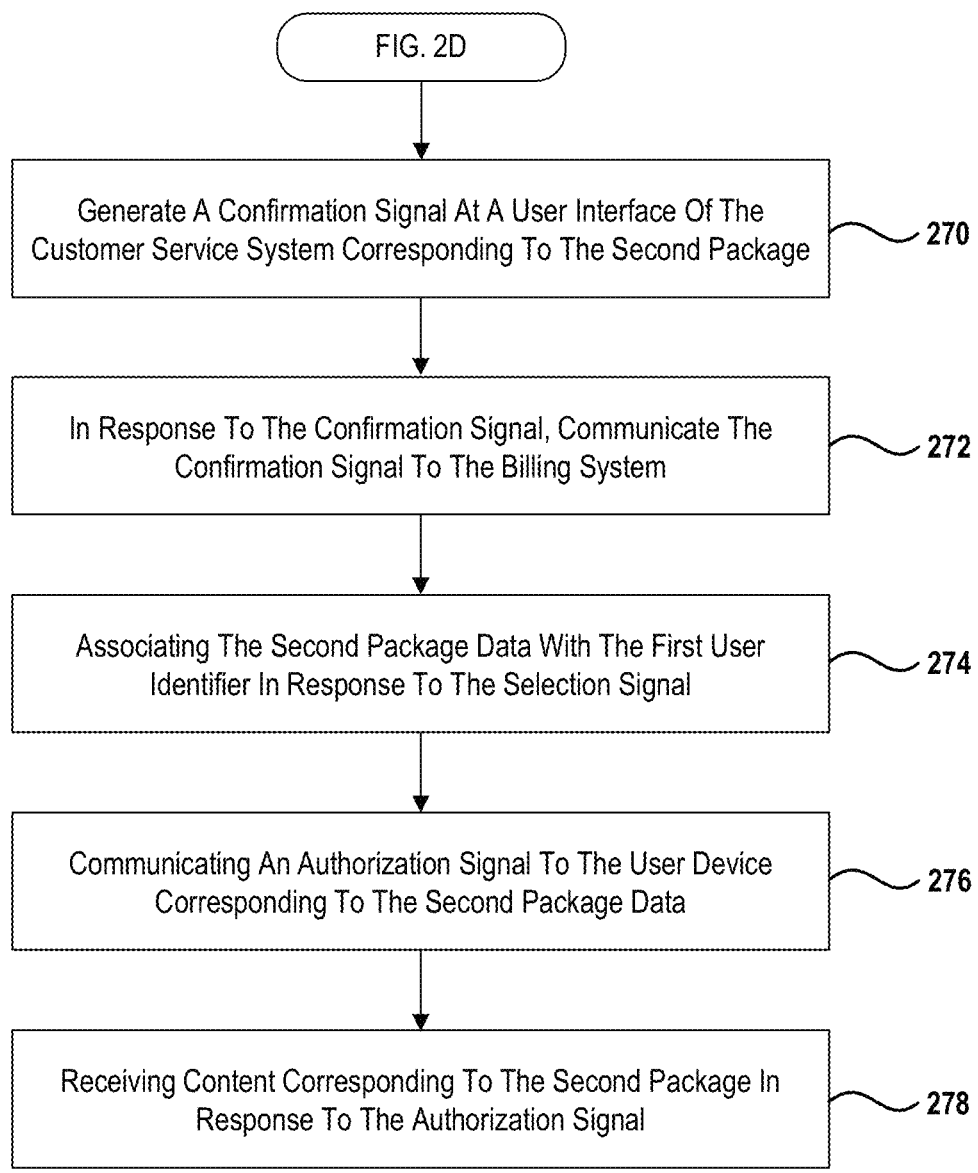

The following description is merely exemplary in nature and is not intended to limit the present disclosure, application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

The teachings of the present disclosure can be implemented in a system for communicating content to an end user or user device. Both the data source and the user device may be formed using a general computing device having a memory or other data storage for incoming and outgoing data. The memory may comprise but is not limited to a hard drive, FLASH, RAM, PROM, EEPROM, ROM phase-change memory or other discrete memory components.

Each general purpose computing device may be implemented in electrical circuitry, analog circuitry, digital circuitry, and system on chips, or combinations thereof. Further, the computing device may include a microprocessor (processor) or microcontroller that performs instructions to carry out the steps performed by the various system components.

A content or service provider is also described. A content or service provider is a provider of data to the end user using the head end. The service provider, for example, may provide data corresponding to the content such as metadata as well as the actual content in a data stream or signal. The content or service provider may include a general purpose computing device, communication components, network interfaces and other associated circuitry to allow communication with various other devices in the system.

Further, while the following disclosure is made with respect to the delivery of video (e.g., television (TV), movies, music videos, etc.), it should be understood that the systems and methods disclosed herein could also be used for delivery of any media content type, for example, audio, music, data files, web pages, advertising, etc. Additionally, throughout this disclosure reference is made to data, content, information, programs, movie trailers, movies, advertising, assets, video data, etc., however, it will be readily apparent to persons of ordinary skill in the art that these terms are substantially equivalent in reference to the example systems and/or methods disclosed herein. As used herein, the term title will be used to refer to, for example, a movie itself and not the name of the movie. As used herein, the content will be used to refer to, for example, a movie or program itself. Content identifier refers to the data associated with content used for identifying the content. Machines may use an actual numeric or alphanumeric value unique to the content. People may use a title for identification. Both types and other types of data may be associated with the content for association. For program guides and recommendations list content identifiers, a cluster identifier and other data may also be provided with the content.

While the following disclosure is made with respect to example DIRECTV® broadcast services and systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a service provider and integrated receiver/decoders (IRDs) as described below can be reallocated as desired without departing from the intended scope of the present patent. An IRD may be implemented in a set-top box, a smart TV, a client device, a portable mobile device or a gaming system.

In the following examples, recommendations of titles of various programs are provided. The content recommendations may provide a title either graphically or alpha-numerically or a combination of both. Graphically, content posters or thumbnails may be provided. Several lists are generated, sorted and processed herein. The lists may include content or program titles or one or more alphanumeric identifiers or both. The list may not contain the actual content itself.

Referring now to FIG. 1, a satellite television broadcasting system 10 is illustrated. The satellite television broadcast system 10 includes a head end 12 that generates wireless signals 13 through an antenna 14 which are received by an antenna 16 of a satellite 18. The wireless signals 13, for example, may be digital. The wireless signals 13 may be referred to as an uplink signal. A transmitting antenna 20 generates downlink signals 26 that are directed to various user receiving devices 22 such as those in the home or building 28. The user devices 22 may be referred to as a set top box.

The building 28 may be a house, multi-dwelling unit or commercial building. A local area network 30 may be used to connect user receiving device 22 with client devices 32. The local area network 30 may be a wireless network or a wired network.

Multiple user receiving devices 22 are illustrated in FIG. 1. The other user devices may be located in the building 28 or located external to the building. The other set top boxes may be independent user accounts from the set top box within the building 28. Each user receiving device 22 may also include a DVR that stores content therein.

The user receiving device 22 may also be in communication with the head end 12 through a wide area network 40, the local area network 30 and a router 42. The wide area network 40 may be one type of network or multiple types of networks. The network 40 may, for example, be a public switched telephone network, the internet, a mobile telephone network or other type of network.

The user receiving device 22 and the client device 32 may be in communication with a display 44 used for displaying content. The display 44 may be a monitor or television, or other screen device used for displaying content, program guides, descriptions, graphical user interfaces and the like.

The head end 12 may include an uplink system 50 that formats the signals and multiplexes the signals to generate the uplink signals 13. The uplink system 50 is thus in communication with the set top boxes 22 through the satellite 18. The uplink system 50 may uplink content as well as other data. For example, the uplink system 50 may uplink program guide data and other data associated with various content. The types of content uplinked may include, but are not limited to, linear content that is broadcasted at predetermined times, pay-per-view content which is also linear content, but must be paid for separately for access, and on-demand content that is communicated upon request from a user.

An authorization module 52 is in communication with the uplink system 50. The authorization module 52 may be used to generate an authorization signal such as a conditional access packet that is communicated to the uplink system 50. The conditional access packet may be used for authorizing a set top box 22 or allowing a set top box to access content channels in a content package. Thus, various conditional access packets may be communicated to a user depending upon the package paid for by the users. The conditional access packet may include a user identifier so the conditional access packet is addressed to the authorized set top box 22.

A billing module 54 may also be included within the head end. The billing module 54 may associate an account identifier with a content package. The billing module 54 may be accessed through an automated system or through interaction with a customer service representative. The billing module 54 may also determine whether an account is delinquent. A delinquency flag may be associated with a user account identifier when an account is delinquent. Thus, delinquent account data may include a flag or other indicator of delinquency. Delinquent accounts may be targeted for channel package adjustment.

A package data module 56 may also be included within the head end 12 as well. The package data module 56 includes package data for various content packages. The package data includes a list of content channels, the channel numbers, a description of the channels and a cost for each package. Less expensive packages may be suggested for delinquent accounts. Cost may be obtained from the billing module 54.

A filter module 58 may also be included within the head end 12. The filter module 58 may be used for filtering data from the package data module 56 and from the billing module 54. The filter module 58 may determine package data and corresponding lower cost content packages, and determine the delinquent accounts.

An audience measurement module 60 may also be included within the head end 12. The audience measurement module 60 may receive data from the set top boxes 22. This may be done incrementally over time. The data from the set top boxes 22 corresponds to the channel viewing history associated with the user account. The viewing history data may be high level data, such as the most frequently used individual channels, or may present detailed data such as how frequently the individual channels are viewed and the duration the individual channels are turned on for, and a specific ranking of the channels. The filter module 58 may be used to filter and sort the data history. The viewing history data may be collected for a predetermined amount of time, such as weeks or months. Ranking of the channels may also include filters and weights based on behavioral data (e.g. surfing guide while still tuned to a channel). This will allow a customer service representative to better recommend content channel packages.

A customer service system 70 may be in communication with the head end 12 through the network 40. The customer service system 70 may include an interface 72 that interfaces with the head end 12 and the network 40.

The customer service system 70 may also include a display 74 and a user interface 76. The display 74 may be a monitor or other type of screen display. A user interface 76 such as a mouse, keyboard, or a touch screen may be used to interact with the customer service system.

A package sorting module 78 may receive package data from the package data module 56. The package sorting module 78 may determine lower cost content data packages.

A ranking module 80 may also be included within the customer service system 70. The ranking module 80 may be used to rank the various packages by the watch channels they contain. The ranking module 80 may also be used for sorting the channel data. As will be described below, the channels excluded data, channels retained data, and channels gained data may all be displayed on the display 74 as an excluded channels list, a retained channels list and a gained channels (new channels) list.

An experience data module 82 may be used for storing a user experience such as a length of time for accessing the data (handling time for the customer interaction), whether a new package was accepted, and retention of the changed package by the customer.

The user interface 76 may also interact with the interface 72 for selecting a content channel package other than the current content channel package for the user. A confirmation signal may be generated and communicated to the billing module 54 of the head end 12. The billing module 54 of the head end may communicate an authorization signal through the satellite 18 or through the network 40 to the set top box 22. Once the authorization signal has been received by the user device, access to content channels in a second content channel package is enabled.

Referring now to FIGS. 2A-2D, a method of generating a recommendation for a content package is set forth. In step 210 a first content package is selected by a first user. The first content package may be selected for a new user upon initialization of service with the service provider. In step 212 the first content package data and a user account identifier are associated together at the billing module 54 of the head end. In step 214 the authorization module 52 generates a conditional access packet that is communicated through the network 40 or the satellite 18 to the set top box to enable the set top box to receive the content channels associated with the first content package. In step 216 the channels of the user device such as the set top box may be tuned to any one or more of the various channels in response to the conditional access packet. That is, the user device such as the set top box is enabled to receive all of the content channels in the first content package.

In step 218, as channels are tuned to in the user receiving device, channel data and an account identifier are communicated to the audience measurement module 60 of FIG. 1. The data may be communicated instantly or gathered and communicated in batches. The audience measurement module 60 may store the channel viewing history 220. The viewing history may comprise many aspects such as the frequency of individual channel use, which is how often the channels are viewed by the user, or the duration of channel use, or both. Channels tuned to for a longer duration are most likely more important than channels tuned to briefly before tuning away.

In step 230 the billing module 54 and/or the filter module 58 may determine delinquency data for various user accounts. The delinquent account data may be flagged by the billing module 54 when an account is a predetermined dollar amount overdue, or that an account has been overdue for over a predetermined amount of time. In step 232 the accounts are filtered based on delinquent account data and the audience measurement data to form target data and current package data. That is, the filter module 58 filters the delinquent accounts and provides the delinquent accounts as well as the audience measurement data to form target data. The target data also includes the current packages associated with the user identifier. Thus, target data may identify multiple delinquent accounts. Of course, the system may also be used for non-delinquent accounts as well. The use of the system for determining a proper package for non-delinquent accounts may also be performed.

In step 234 the target data is communicated to the customer service system 70 illustrated in FIG. 1. In step 236 the customer service system is accessed by a customer service representative. The customer service representative may retrieve or enter an account identifier in step 238. Ultimately, the account identifier is used to obtain the current channel package data associated with the identifier. A customer may be contacted through a telephone or through an interactive chatting system or a customer may initiate contact to the service provider. Consent may be obtained for displaying and retrieving the channel history for the customer. In step 240 it is determined whether consent has been obtained. If consent has not been obtained, another customer may be serviced in step 238. In step 240, when a consent signal has been entered by the user interface 76, the channel history for the first content package may be received and displayed. In step 244 the first content package data may be received as well. The first content package data provides the channels that are set forth within the first content package data.

In step 246 a list of lower cost content packages may be determined. That is, packages having a lower price may be determined. In step 248 a comparison list is generated that compares the channel history and a quick summary of the channels in the lower cost package. The actual cost amount may be obtained directly from the billing module of the head end. A correlation may be performed so that the most relevant content packages are displayed toward the top of the list. In this example, a percentage watch may be displayed to show the correlation.

In step 250 a package selection signal may be generated through the user interface 76 to select a package corresponding to a second content package having second content data. This will allow the system operator to evaluate the correlation of the second content package with the first content package. In step 252 the first content package data and the second content package data are compared. In step 254 the duration of channels to be displayed may be set forth. The duration of channels corresponds to the viewing history are described above. The viewing history for a predetermined amount of time, such as one month, two weeks, or three months may be used to determine the correlation described above. This may be selectable by the customer service representative through the user interface. In step 256 the channels from the first content package may be ranked according to the most watched based on the viewing history. A screen display for the same is set forth below.

In step 260, a package selection signal displaying the comparisons may be generated having an excluded channels list, a retained channels list, and a gained channels list. Some packages may include additional channels not available in other packages. The retained channels are the channels that will continue to be available in the second package, while the excluded channel list contains the channels that will be unavailable when a customer switches to a second package.

A confirmation signal is generated at a user interface of the customer service system in step 270. The confirmation signal corresponds to the second content package currently being displayed on the display 74. In step 272 the confirmation signal is communicated to the billing system through the network 40 in response to generating the communication signal. In step 274 the second package data is associated with the first user in response to the selection signal. The data may be associated with the first user identifier at the billing module 54 of the head end 12. An authorization signal may be generated at the authorization module 52 in response to associating the second package data with the first user identifier. The authorization signal in step 276 is communicated through the satellite or the network.

In step 278 the conditional access signal is stored within the user receiving device and therefore content corresponding to the second package is received in response to the authorization signal. The conditional access packet allows the content corresponding to the content package signal to be decoded at the user receiving device.

Figure 3:
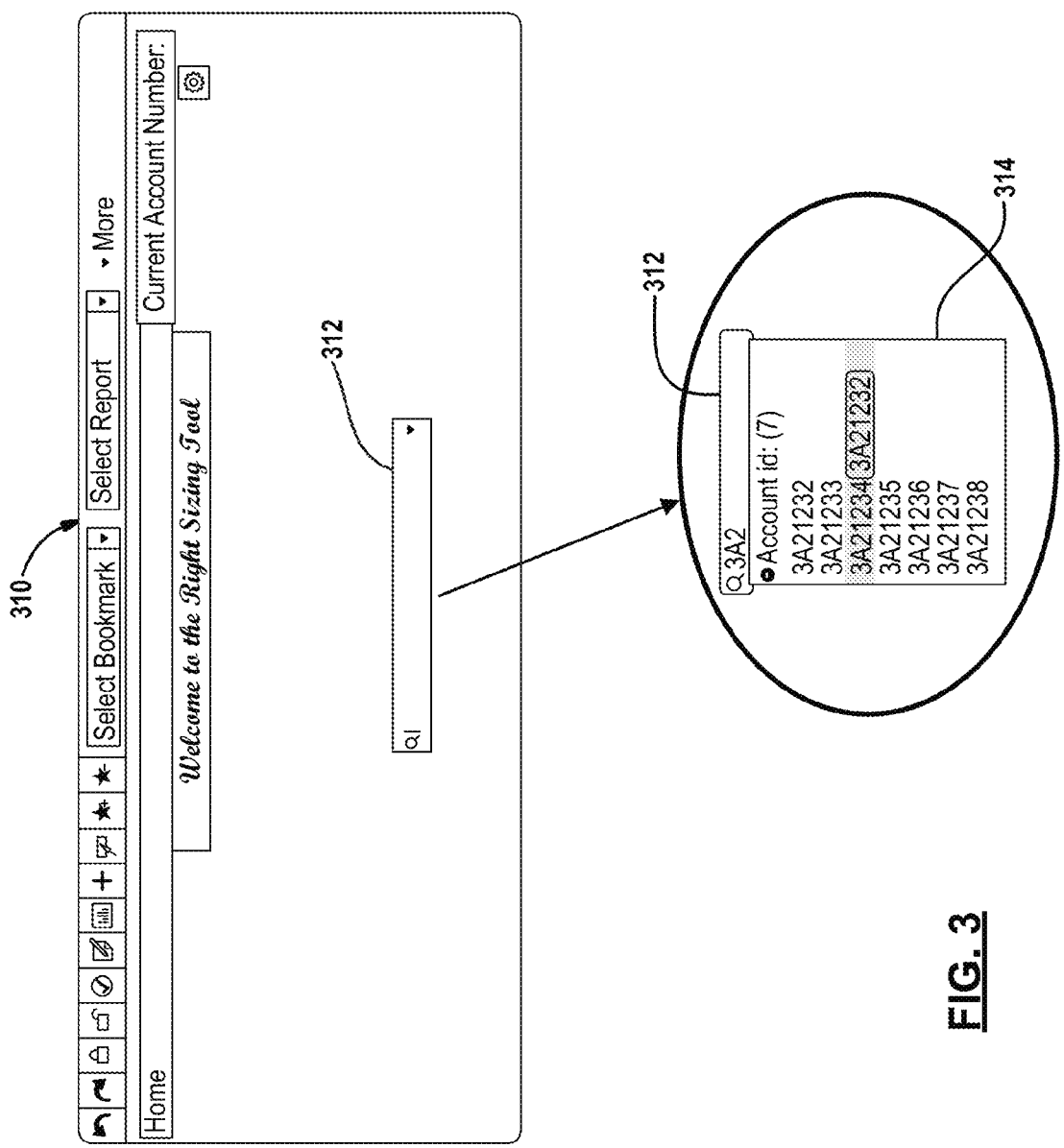
FIG. 3 is a screen display of a user interface for accessing a customer service system.

Referring now to FIG. 3, a screen display 310 is illustrated for entering a user account identifier. In box 312, a user account identifier may be entered manually or automatically entered from the target data received from the billing module received through the interface 72 of FIG. 1. Account numbers may be retrieved by selecting box 312 from a dropdown menu.

Figure 4:
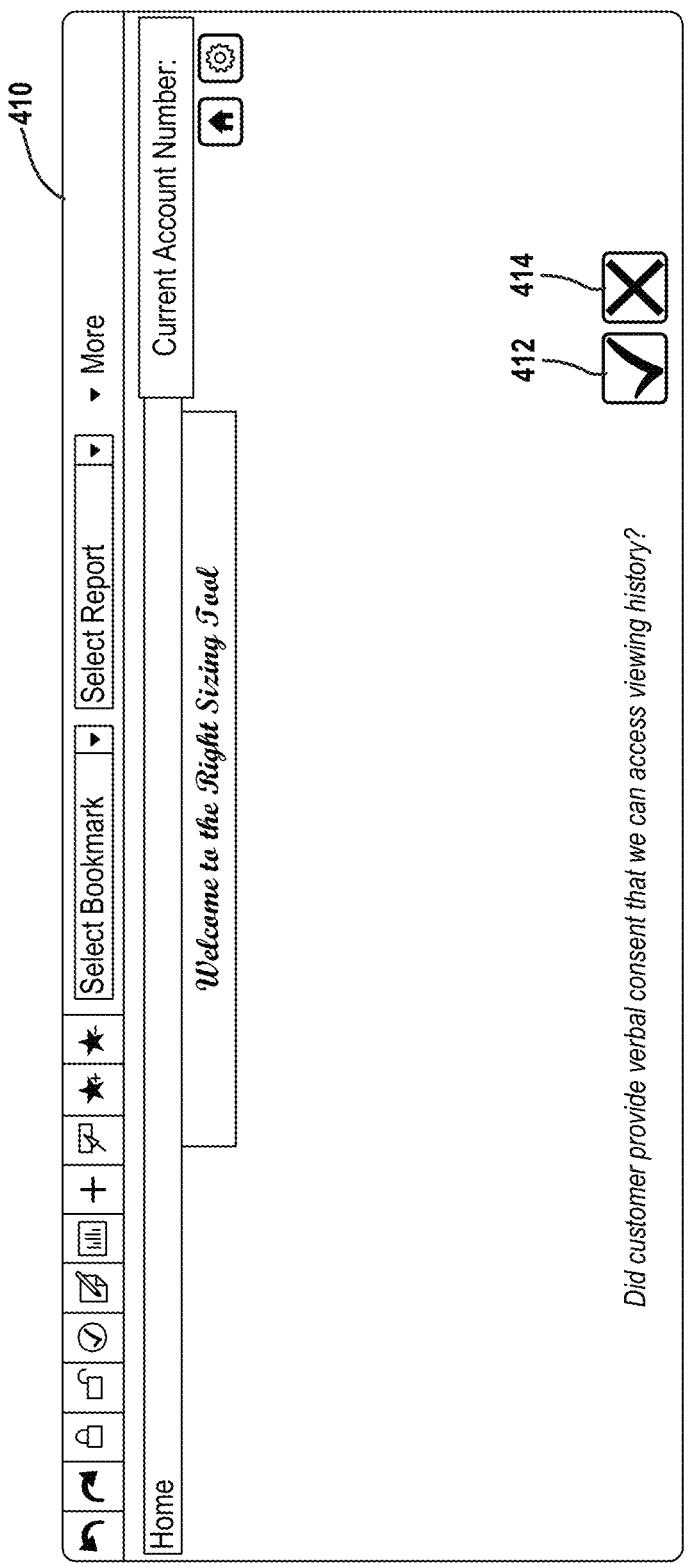
FIG. 4 is a screen display of the user interface for generating a consent signal.

Referring now to FIG. 4, a consent screen display 410 is illustrated for generating a consent signal. A consent signal is generated when the box 412 is selected. A consent signal enables a recommendation page to be initiated and the channel viewing history to be viewed during the process.

Referring now to FIG. 5, a screen display 510 is illustrated that provides a plurality of columns corresponding to recommendation of content packages. The recommended content packages set forth are less expensive than the first content package to which the customer is subscribed. The first column corresponds to the percentage of watched channels in the package. The percentage of watched channels in the package corresponds to a comparison of the present package versus one of the recommended packages. In this case, the "Choice" package matches 78 percent of the channels. The names of the less expensive recommended packages are displayed in column 512. The number of channels in a package is displayed in column 514. The channels common to the current package is illustrated in column 560. The reduction in channels list is set forth in column 518. In this example, 78 percent of the watched channels are of the presently active content package, the "Choice" package. Each package may include a package identifier set forth in the column package. The number of channels in the package in this example is 261. All 261 channels are in the current package of the user. If the "Choice" package were selected, 52 channels would be removed.

The screen display 510 also includes an account identifier field 520 that provides an account number or other type of account identifier. A package identifier 522 is set forth for providing a package identifier for the current (first) package of the customer. A package name 524 may also be set forth. The total number of channels may be set forth in box 526. A ranking may be provided in box 528, and the status may be provided in box 530. A compared package status 532 may also be provided. A compared category and subcategory 534 may also be provided. A selector box 540 may be used for entering a downsized package identifier.

Figure 6:
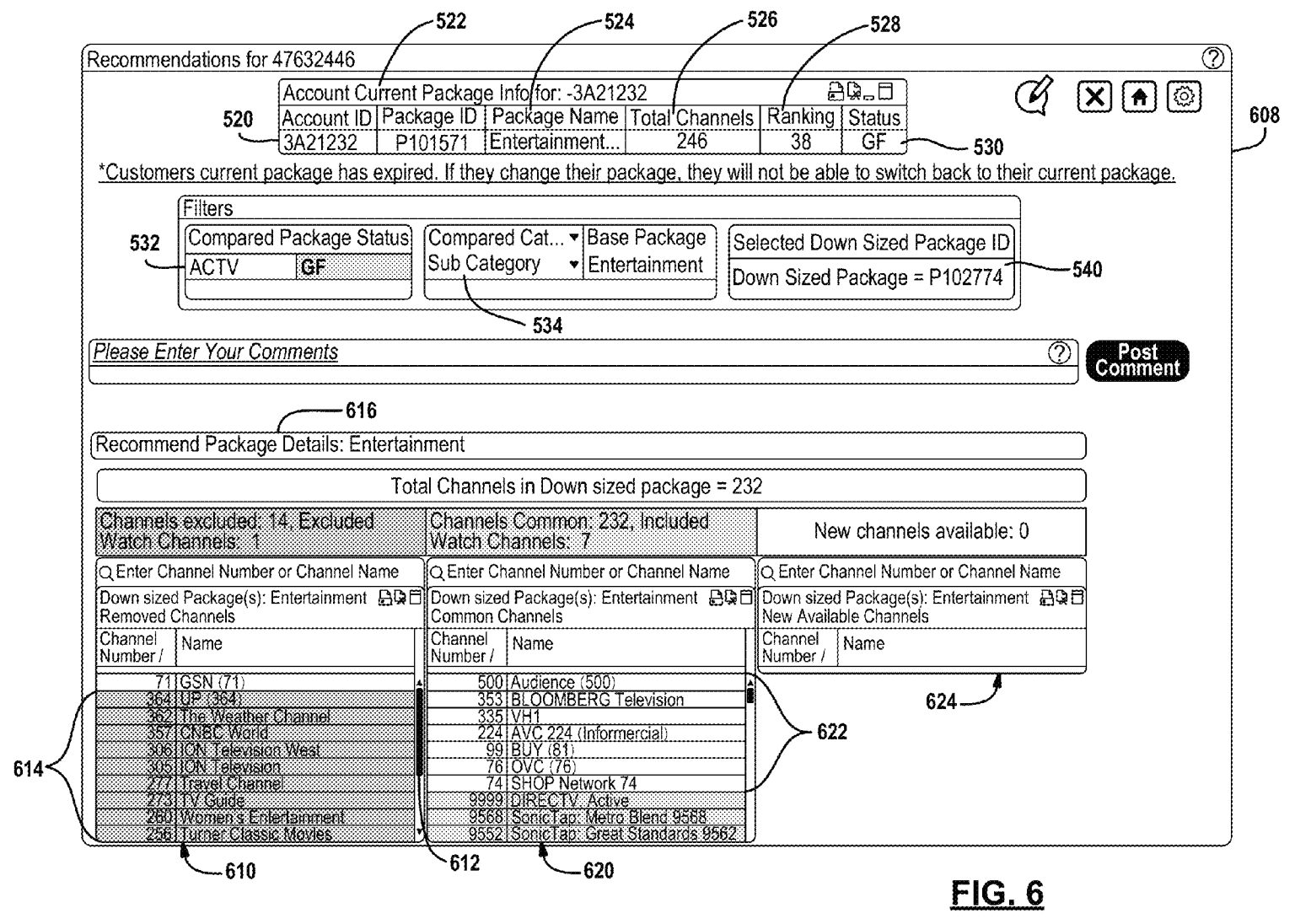

Referring now to FIG. 6, a screen display 608 illustrating details of a selected package in comparison with the present package is set forth. In this example, the Entertainment Classic package is selected, and thus a comparison with the Entertainment Classic package (the second content package) as compared to the Xtra package (the first content package) is set forth. The Entertainment Classic package is the second package in the package column of FIG. 5. In column 610 and excluded channels list are provided. The excluded channels have 14 channels set forth. The scroll bar 612 may be used to scroll to see all 14 channels. The excluded channels list may be color coded for channels excluded but unwatched 614, and excluded channels that are watched at 616. In this example, the Game Show Network (GSN) is an excluded channel that is popular with the present customer. In column 620 a common channel list is illustrated. The common channel list includes seven watched channels 622 and 232 channels all together.

In 624 a gained channels list is provided. The gained channels list provides additional channels that are available by selecting the second or alternate content package.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A method comprising:
associating first content package data with first account data comprising a first account identifier at a billing system, said first content package data comprising a first plurality of content channels;
communicating a viewing history from a first user device associated with the account identifier to an audience measurement module located remotely from the first user device;
storing the viewing history over time at the audience measurement module;
communicating account data and the viewing history to a customer service system through a network;
selecting second content package content data at the customer service system to form a selection signal, said second content package data comprising a second plurality of content channels different than the first plurality of content channels;
displaying a comparison list that simultaneously compares the first plurality of content channels and the second plurality of content channels at a display of the customer service system loaded remotely from the first user device, said comparison list comprising a channels lost list and a channels retained list when the second content package is confirmed;
generating a confirmation signal at the customer service system based on a selection of the second content package data for the first account identifier;
communicating the confirmation signal through a network to the billing system;
associating the second content package data with the first account data at the billing system; and
communicating an authorization signal from an authorization module associated with the customer service system to the first user device through a network to enable access to the first user device to the second plurality of content channels of the second content package.

2. The method as recited in claim 1 wherein communicating viewing history comprises communicating frequency of individual channel use.

3. The method as recited in claim 1 wherein communicating viewing history comprises communicating history of individual channel use.

4. The method as recited in claim 1 wherein communicating account data comprises communicating delinquent account data and respective viewing histories to the customer service system.

5. The method as recited in claim 1 wherein prior to selecting a second content package listing a package list comprises less expensive content packages.

6. The method as recited in claim 1 wherein prior to selecting a second content package listing a package list comprises less expensive content packages ranked be a correlation with viewing history.

7. The method as recited in claim 1 wherein displaying the comparison list comprises displaying a comparison comprising a plurality of content packages with the first package, said plurality of packages each having a cost less than a first cost of the first content package.

8. The method as recited in claim 1 wherein displaying the comparison list comprises a comparison of the viewing history and the second content package.

9. The method as recited in claim 1 wherein displaying the comparison list comprises displaying an excluded channels list corresponded to channels lost by adopting the second content package.

10. The method as recited in claim 9 further comprising displaying watched channels before unwatched channels in the excluded channels list.

11. The method as recited in claim 1 wherein displaying the comparison comprises displaying a retained channels list corresponding to channels retained by adopting the second content package.

12. The method as recited in claim 11 further comprising displaying watched channels before unwatched channels in the channels retained list.

13. A system comprising:
a first user device;
a head end comprising an audience measurement module in communication with the first user device located remotely from the first user device;
a billing system in the head end in communication with the audience measurement module associating first content package data with first account data comprising a first account identifier, said first content package data comprising a first plurality of content channels;
said first user device communicating a viewing history from the first user device associated with the account identifier to the audience measurement module;
the audience measurement module storing the viewing history over time;
a customer service system in communication with the head end through a network;
said head end communicating account data and the viewing history to a customer service system through a network;
said customer service system forming a selection signal by selecting second content package data in response to a user interface, said second content package data comprising a second plurality of content channels different than the first plurality of content channels;
a display in communication with the customer service system displaying a comparison list comparing the first plurality of channels of the first content package data and the second plurality of channels of the second content package data, said comparison list comprising a channels lost list and a channels retained list when the second content package is confirmed;
said customer service system generating a confirmation signal based on a selection of the second content package data for the first account identifier;
said customer service system communicating the confirmation signal through a network to the billing system;
said billing system associating the second content package content data with the first account data; and
an authorization module communicating an authorization signal to the first user device to enable access to the second plurality of content channels of receiving the second content package from the first user device.

14. The system as recited in claim 13 wherein the viewing history comprises frequency of individual channel use.

15. The system as recited in claim 13 wherein the viewing history comprises a history of individual channel use.

16. The system as recited in claim 13 wherein the account data comprises delinquent account data.

17. The system as recited in claim 13 wherein the customer service system generates a package list comprises less expensive content packages.

18. The system as recited in claim 13 wherein the customer service system generates a package list comprises less expensive content packages ranked in correlation with viewing history.

19. The system as recited in claim 13 wherein the comparison list comprises a plurality of content packages with the first package, said plurality of packages each having a cost less than a first cost of the first content package.

20. The system as recited in claim 13 wherein the comparison list comprises a comparison of the viewing history and the second content package.

21. The system as recited in claim 13 wherein the comparison list comprises an excluded channels list corresponded to channels excluded by adopting the second content package.

22. The system as recited in claim 21 further wherein the excluded channels list comprises watched channels before unwatched channels.

23. The system as recited in claim 13 wherein the comparison list comprises displaying a retained channels list corresponding to channels retained by adopting the second content package.

24. The system as recited in claim 23 wherein the retained channels list comprises watched channels before unwatched channel.

* * * * *